(12) United States Patent
Dong

(10) Patent No.: US 12,490,135 B2
(45) Date of Patent: Dec. 2, 2025

(54) REQUEST SENDING METHOD AND APPARATUS, AND MEASUREMENT RESULT SENDING METHOD AND APPARATUS

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 307 days.

(21) Appl. No.: 18/031,995

(22) PCT Filed: Oct. 15, 2020

(86) PCT No.: PCT/CN2020/121305
§ 371 (c)(1),
(2) Date: Apr. 14, 2023

(87) PCT Pub. No.: WO2022/077389
PCT Pub. Date: Apr. 21, 2022

(65) Prior Publication Data
US 2023/0370881 A1 Nov. 16, 2023

(51) Int. Cl.
*H04W 24/10* (2009.01)
*G01S 5/00* (2006.01)
(Continued)

(52) U.S. Cl.
CPC .......... *H04W 24/10* (2013.01); *G01S 5/0063* (2013.01); *H04L 5/0048* (2013.01); *H04W 72/231* (2023.01)

(58) Field of Classification Search
None
See application file for complete search history.

(56) References Cited

U.S. PATENT DOCUMENTS

2020/0259683 A1    8/2020  Manolakos et al.
2022/0368496 A1*  11/2022  Shreevastav .......... H04L 5/0094
(Continued)

FOREIGN PATENT DOCUMENTS

CN    107743060 A    2/2018
CN    110022523 A    7/2019
(Continued)

OTHER PUBLICATIONS

ISA State Intellectual Property Office of the People's Republic of China, International Search Report Issued in Application No. PCT/CN2020/121305, Jun. 29, 2021, WIPO, 4 pages.
(Continued)

*Primary Examiner* — Saad Khawar
(74) *Attorney, Agent, or Firm* — Volpe Koenig

(57) ABSTRACT

A request sending method, electronic device and computer readable storage medium that improves performance of a wireless communication network. The wireless performance is improved by sending a first message to a base station, where the first message includes a position information request and a measurement result request, the position information request is used to request the base station to determine sounding reference signal (SRS) configuration information of a terminal, and the measurement result request is used to request the base station to send a measurement result for an SRS sent by the terminal to a core network; receiving a second message from the base station, where the second message includes the measurement result.

9 Claims, 11 Drawing Sheets

(51) Int. Cl.
*H04L 5/00* (2006.01)
*H04W 72/231* (2023.01)

(56) References Cited

U.S. PATENT DOCUMENTS

| | | | |
|---|---|---|---|
| 2023/0029850 A1* | 2/2023 | Park | H04L 1/189 |
| 2024/0430845 A1* | 12/2024 | Tenny | G01S 5/02213 |

FOREIGN PATENT DOCUMENTS

| | | |
|---|---|---|
| CN | 111356075 A | 6/2020 |
| WO | 2020/073644 A1 | 4/2020 |
| WO | 2020151757 A1 | 7/2020 |

OTHER PUBLICATIONS

Ericsson et al. "Introduction of NR Positioning in NRPPa" "3GPP TSG-RAN WG3 #109 R3-205808 Online, Aug. 17-28, 2020" Aug. 28, 2020, 127 pages.

State Intellectual Property Office of the People's Republic of China, The First Office Action Issued in Application No. 2020800027370, Apr. 27, 2023, 15 pages.

State Intellectual Property Office of the People's Republic of China, The Second Office Action Issued in Application No. 2020800027370, Jan. 3, 2024, 15 pages.

ISA State Intellectual Property Office of the People's Republic of China, Written Opinion of the International Searching Authority Issued in Application No. PCT/CN2020/121305, Jun. 29, 2021, WIPO, 9 pages.

Ericsson, "Discussion on support of Aperiodic positioning of SRS configuration and other aspects", 3GPP TSG-RAN WG3 #108-e, R3-203737, Online, Jun. 1-11, 2020, 7 pages.

* cited by examiner

REQUEST SENDING METHOD AND APPARATUS, AND MEASUREMENT RESULT SENDING METHOD AND APPARATUS

CROSS-REFERENCE TO RELATED APPLICATION

The present application is the U.S. National Phase of PCT Application No. PCT/CN2020/121305, filed on Oct. 15, 2020, which is incorporated herein by reference in its entirety.

TECHNICAL FIELD

The present disclosure relates to the field of communication technologies, and in particular to a request sending method, a measurement result sending method, a request sending apparatus, a measurement result sending apparatus, an electronic device, and a computer readable storage medium.

BACKGROUND

In the related arts, when a position of a terminal is to be determined, a core network may obtain a measurement result of a base station for a sounding reference signal (SRS) sent by the terminal, and hence, based on the measurement result, the position of the terminal is determined.

A positioning process based on the current positioning flow may take close to 50 ms, and the positioning process does not satisfy the current requirements for low delay.

SUMMARY

In view of the above, embodiments of the present disclosure provide a request sending method, a measurement result sending method, a request sending apparatus, a measurement result sending apparatus, an electronic device, and a computer readable storage medium, so as to solve the technical problems in the related arts.

According to a first aspect of embodiments of the present disclosure, there is provided a request sending method, which is applied to a core network and includes:
  sending a first message to a base station, where the first message includes a position information request and a measurement result request, the position information request is used to request the base station to determine sounding reference signal (SRS) configuration information of a terminal, and the measurement result request is used to request the base station to send a measurement result for an SRS sent by the terminal to the core network; and
  receiving a second message from the base station, where the second message includes the measurement result.

According to a second aspect of embodiments of the present disclosure, there is provided a measurement result sending method, which is applied to a base station and includes:
  receiving a first message from a core network, where the first message includes a position information request and a measurement result request;
  based on the position information request, determining sounding reference signal (SRS) configuration information of a terminal;
  sending the SRS configuration information to the terminal; and
  based on the measurement result request, sending a second message to the core network, where the second message includes a measurement result for an SRS sent by the terminal.

According to a third aspect of embodiments of the present disclosure, there is provided a request sending apparatus, which is applied to a core network and includes:
  a first sending module, configured to send a first message to a base station, where the first message includes a position information request and a measurement result request. The position information request is used to request the base station to determine sounding reference signal (SRS) configuration information of a terminal, and the measurement result request is used to request the base station to send a measurement result for an SRS sent by the terminal to the core network; and
  a receiving module configured to receive a second message from the base station, where the second message includes the measurement result.

According to a fourth aspect of embodiments of the present disclosure, there is provided a measurement result sending apparatus, which is applied to a base station and includes:
  a receiving module, configured to receive a first message from a core network, where the first message includes a position information request and a measurement result request;
  a configuration determining module, configured to, based on the position information request, determine sounding reference signal (SRS) configuration information of a terminal;
  a first sending module, configured to send the SRS configuration information to the terminal; and
  a second sending module, configured to, based on the measurement result request, send a second message to the core network, where the second message includes a measurement result for an SRS sent by the terminal.

According to a fifth aspect of embodiments of the present disclosure, there is provided an electronic device, including:
  a processor; and,
  a memory storing instructions executable by the processor;
  where the processor is configured to perform the above-mentioned request sending method.

According to a sixth aspect of embodiments of the present disclosure, there is provided an electronic device, including:
  a processor; and,
  a memory storing instructions executable by the processor;
  where the processor is configured to perform the above-mentioned measurement result sending method.

According to a seventh aspect of embodiments of the present disclosure, there is provided a computer readable storage medium, storing computer programs thereon, where the programs are executed by a processor to perform the steps of the above-mentioned request sending method.

According an eighth aspect of embodiments of the present disclosure, there is provided a computer readable storage medium, storing computer programs thereon, where the programs are executed by a processor to perform the steps of the above-mentioned measurement result sending method.

In the embodiments of the present disclosure, the core network may carry the position information request and the measurement result request in one message (i.e., in the first message), and the first message is sent to the base station, and the measurement result of the base station for the SRS sent by the terminal may be obtained by only receiving one message from the base station (i.e., the second message). Thus, the number of times of communication between the core network and the base station can be reduced, such that the positioning flow is simplified, the time required for a positioning process is reduced, and the requirements for low delay are satisfied.

BRIEF DESCRIPTION OF THE DRAWINGS

To describe the technical solutions in embodiments of the present disclosure more clearly, drawings required in descriptions of the embodiments of the present disclosure will be briefly introduced below. It is apparent that the drawings described below are merely embodiments of the present disclosure, and other drawings may be obtained by those of ordinary skill in the prior art based on these drawings without making creative work.

DETAILED DESCRIPTION OF THE EMBODIMENTS

The technical solutions of the embodiments of the present disclosure will be described below clearly and fully in combination with drawings in the embodiments of the present disclosure. Apparently, the embodiments described herein are merely some embodiments of the present disclosure rather than all embodiments. All other embodiments obtained by those skilled in the art based on these embodiments in the present disclosure, without making creative work, shall fall within the scope of protection of the present disclosure.

Figure 1:
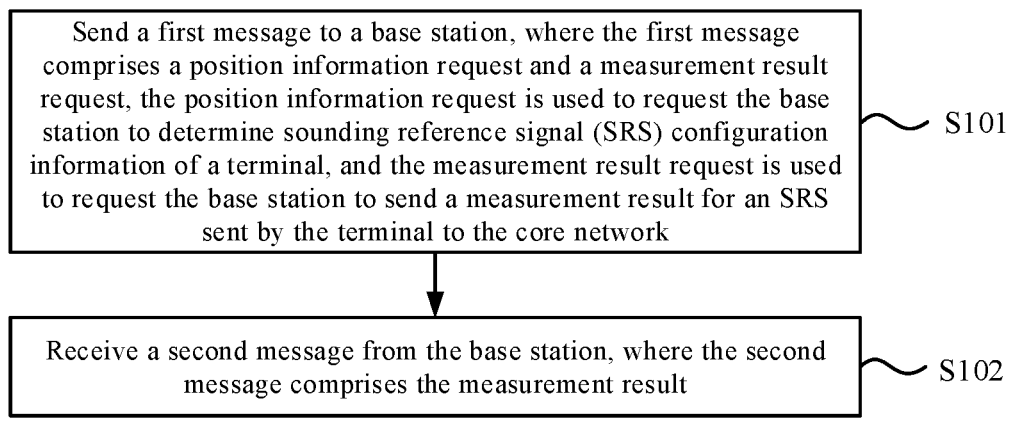
FIG. 1 is a schematic flowchart illustrating a request sending method according to an embodiment of the present disclosure.

FIG. 1 is a schematic flowchart illustrating a request sending method according to an embodiment of the present disclosure. The method shown in this embodiment is applicable to a core network, which includes, but is not limited to, location management function (LMF) and access and mobility management function (AMF), etc. The method may be specifically applied to LMF in an embodiment.

The core network includes, but is not limited to, a 5th generation (5G) core network and a 6th generation (6G) core network. The core network may communicate with a base station, for example, by sending a position information request to the base station, and the base station, after receiving the request, may determine sounding reference signal (SRS) configuration information of a terminal and send the SRS configuration information to the terminal so as to instruct a resource for the terminal to send the SRS.

The SRS is a reference signal sent by the terminal to the base station and may be used to perform uplink (UL) positioning for the terminal and thus can be called positioning SRS, UL positioning SRS, or the like.

The base station may measure a configuration of an SRS sent by the terminal and then send a measurement result to the core network. The core network may, based on a plurality of (e.g., two or more) measurement results, determine a position of the terminal. The terminal may include, but is not limited to, a smartphone, a tablet computer, a wearable device, an industrial sensor, an internet-of-things device, and other electronic devices.

As shown in FIG. 1, the request sending method may include the following steps.

At step S101, a first message is sent to the base station. The first message includes a position information request and a measure result request. The position information request is used to request the base station to determine the sounding reference signal (SRS) configuration information of a terminal, and the measurement result request is used to request the base station to send a measurement result for an SRS sent by the terminal to the core network.

At step S102, a second message is received from the base station, where the second message includes the measurement result.

Figure 2:
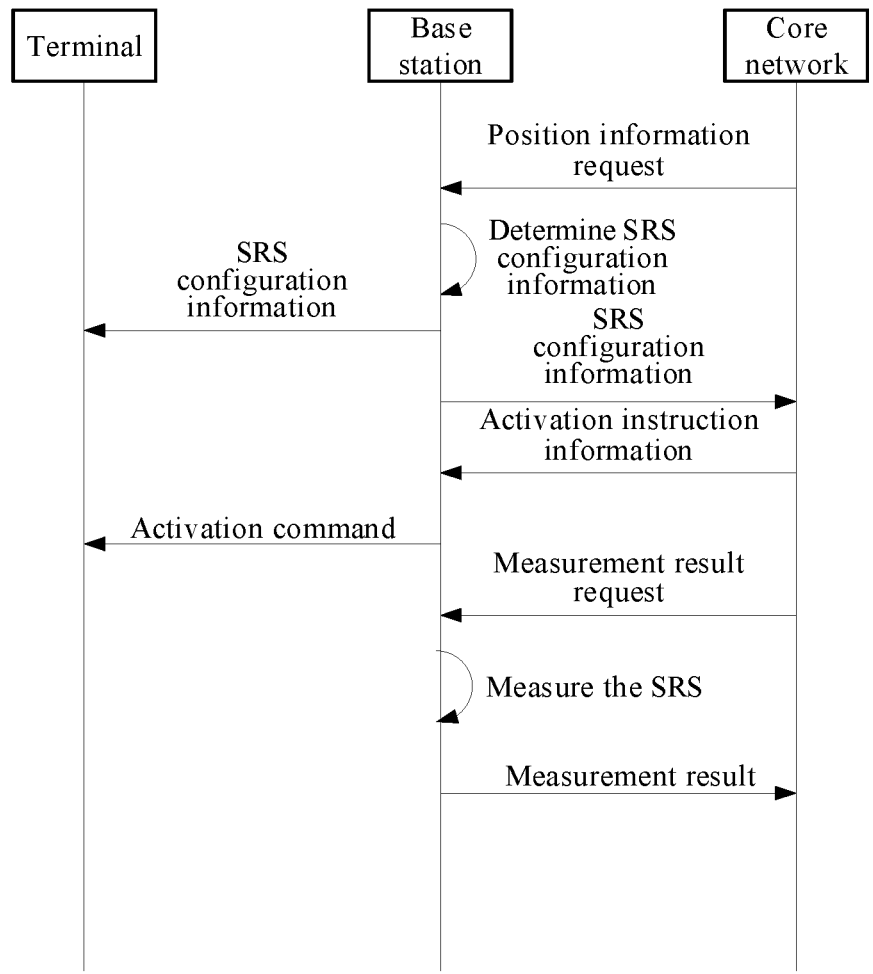
FIG. 2 is a schematic flowchart for performing positioning in the related arts.

FIG. 2 is a schematic flowchart for performing positioning in the related arts.

As shown in FIG. 2, in the related arts, when a core network needs to perform positioning on a terminal, the core network may firstly send a position information request to a base station. The base station may, after receiving the position information request, determine the SRS configuration information of the terminal, and then, on the one hand, send the SRS configuration information to the terminal, and on the other hand, send the SRS configuration information to the core network.

After receiving the SRS configuration information, in response to determining that the SRS configuration information of the terminal is a nonperiodic or semi-persistent SRS, the core network may send activation instruction information to the base station, where the activation instruction information includes an activation request. The base station, after receiving the activation request, sends an activation command to the terminal to activate the terminal to send the SRS.

Furthermore, the core network may send a measurement result request to the base station. The base station, after receiving the measurement result request, performs measurement on the SRS sent by the terminal to obtain a measurement result, and then send the measurement result to the core network. The core network may calculate the position of the terminal based on the measurement result.

Therefore, in the related arts, a positioning process for a terminal at least requires the core network to send two requests to the base station, namely, send the position information request and the measurement result request and further at least requires the base station to send two pieces of information to the core network, namely, send the SRS configuration information and the measurement result to the core network. Each interaction between the base station and the core network may consume some time, and thus, excess interactions may lead to a large delay. In the related arts, a positioning process usually takes 50 ms. However, along with increasing requirements for positioning delay, the positioning delay required currently is about 10 ms. Hence, the delay of 50 ms in the related arts cannot satisfy the requirements.

According to an embodiment of the present disclosure, the core network may carry the position information request and the measurement result request in one message (i.e., in the first message), and then send the first message to the base station. Further, the core network may obtain the measurement result of the base station for the SRS sent by the terminal, by only receiving one message (i.e., the second message) from the base station. Thus, the number of times of communication between the core network and the base station can be reduced, such that the positioning flow is simplified, the time required for a positioning process is reduced, and the requirements for low delay are satisfied.

In an embodiment, the first message and the second message may be NR Positioning Protocol A (NRPPa) messages.

In an embodiment, the measurement result of the base station for the SRS sent by the terminal may include, but is not limited to, a time and an angle of receiving the SRS, a signal intensity, and uplink-relative time of arrival (UL-RTOA), and the like.

In an embodiment, the first message at least includes: activation instruction information for instructing the base station to activate the SRS or not;

where, in response to determining that the activation instruction information instructs the base station to activate the SRS, the base station activates the terminal to send the SRS;

or, in response to determining that the activation instruction information instructs the base station not to activate the SRS, the base station does not activate the terminal to send the SRS.

In an embodiment, the first message may also include or not include activation instruction information; and the method further includes:

sending the first message not including activation instruction information, where the first message not including the activation instruction information is used to instruct the base station not to activate the SRS;

or, sending the first message not including activation instruction information, where the first message not including the activation instruction information is used to instruct the base station to activate the SRS;

or, sending the first message including activation instruction information, where the first message including the activation instruction information is used to instruct the base station not to activate the SRS;

or, sending the first message including activation instruction information, where the first message including the activation instruction information is used to instruct the base station to activate the SRS.

In an embodiment, when it is required to instruct the base station to perform SRS activation-related operations, the first message is sent to the base station, where the first message includes the activation instruction information; when it is required to instruct the base station not to perform the SRS activation-related operations or not to perform the SRS activation-related operations temporarily, the first message is sent to the base station, where the first message does not include the activation instruction information.

In an embodiment, when the first message does not include the activation instruction information, it is defaulted that the first message is used to instruct the base station not to activate the SRS; when the first message does not include the activation instruction information, it is also defaulted that the first message is used to instruct the base station to activate the SRS. The two default manners may be negotiated with the base station in advance based on requirements.

In an embodiment, the core network may, by sending the activation instruction information to the base station, request the base station to activate the terminal to send the SRS or request the base station not to activate the terminal to send the SRS.

For example, the SRS configuration of the terminal is a nonperiodic or semi-persistent SRS. When the activation instruction information includes an activation request, the base station may determine that the core network needs to activate the terminal to send the SRS, thus, the base station may send the activation command to the terminal to activate the terminal to send the SRS; when the activation instruction information includes a non-activation request, the base station may determine that the core network temporarily does not need to activate the terminal to send the SRS, and thus, the base station does not send the activation command to the terminal.

Furthermore, it is to be noted that, the core network may, before sending the first message, send a capability obtaining request to the terminal to request capability information relating to terminal positioning, for example, send an LTE positioning protocol (LPP) message carrying the capability obtaining request to the terminal, and the terminal may send the capability information to the core network.

Figure 3:
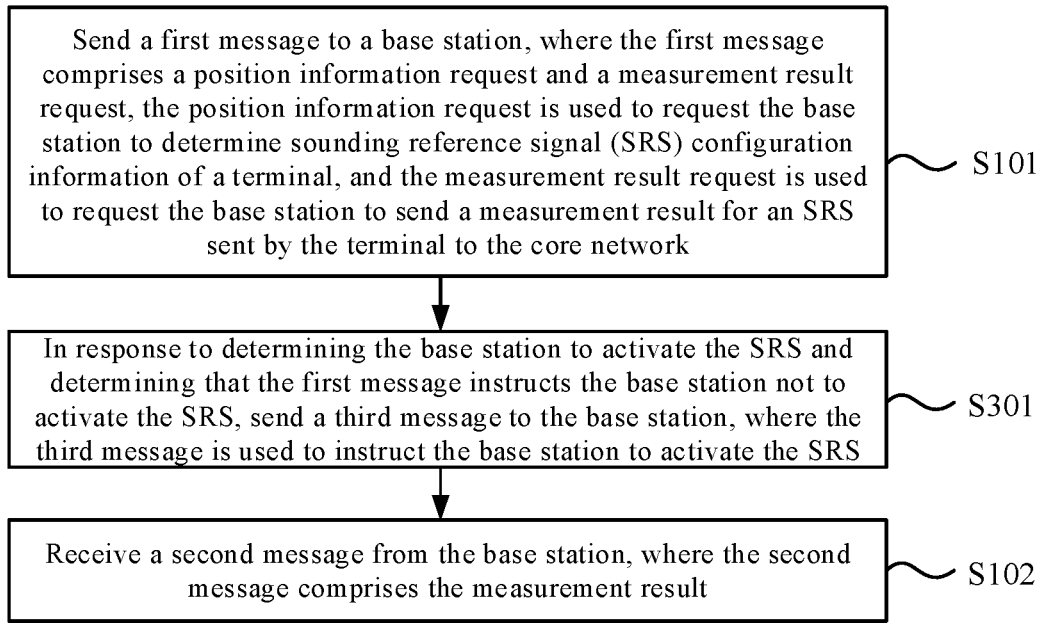
FIG. 3 is a schematic flowchart illustrating a request sending method according to another embodiment of the present disclosure.

FIG. 3 is a schematic flowchart illustrating a request sending method according to another embodiment of the present disclosure. As shown in FIG. 3, the method further includes the following steps.

At step S301, in response to determining the base station to activate the SRS and determining that the first message instructs the base station not to activate the SRS, a third message is sent to the base station, where the third message is used to instruct the base station to activate the SRS.

That is, in response to determining the base station to activate the SRS and the first message instructs the base station not to activate the SRS, a third message is sent to the base station, where the third message is used to instruct the base station to activate the SRS.

In an embodiment, when the activation instruction information includes a non-activation request, the base station does not send an activation command to the terminal and the terminal does not send the SRS to the base station; when the core network needs the terminal to send the SRS to the base station, the core network may subsequently send a third message carrying an activation request to the base station, such that the base station sends an activation command to the terminal so as to activate the terminal to send the SRS to the base station.

In all embodiments, the first message and the third message may be of the same type. For example, both may be NRPPa messages; alternatively, the first message and the third message may be of different types. For example, the first message is an NRPPa message, and the third message is another type of message.

In an embodiment, the second message may also include the SRS configuration information.

In an embodiment, the base station may carry the measurement result and the SRS configuration information in a message (i.e., in the second message) and send the second message to the core network. Compared with the fact that the base station sends the SRS configuration information and the measurement result to the core network separately in the related arts, the number of times of communication between the core network and the base station can be reduced, such that the positioning flow is simplified, the time required for a positioning process is reduced, and the requirements for the low delay is satisfied.

In an embodiment of the present disclosure, the SRS configuration information may be sent together with the measurement result through the second message. In some other embodiments of the present disclosure, the SRS configuration information and the measurement result may be sent through different messages. The specific sending manner may be selected based on actual requirements.

Figure 4:
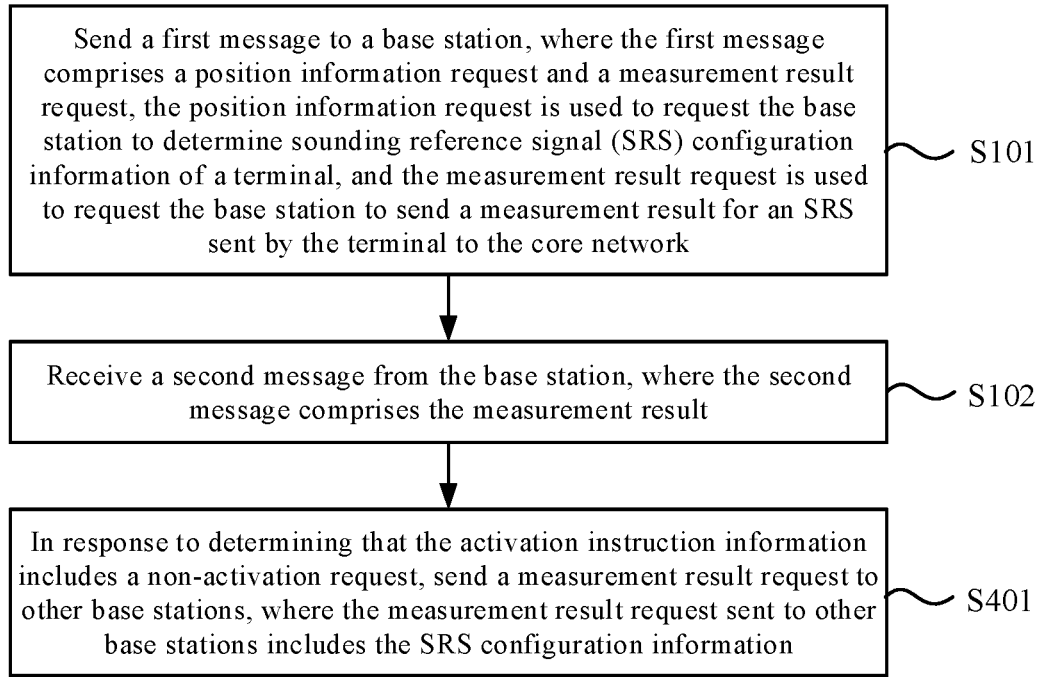
FIG. 4 is a schematic flowchart illustrating a request sending method according to yet another embodiment of the present disclosure.

FIG. 4 is a schematic flowchart illustrating a request sending method according to yet another embodiment of the present disclosure. As shown in FIG. 4, the method includes the following steps.

At step S401, a measurement result request is sent to other base stations, where the measurement result request sent to other base stations includes the SRS configuration information.

In an embodiment, the core network can determine a position of the terminal accurately based on a plurality of measurement results.

When there are a plurality of (two or more) transmission reception points (TRP) in the base station, each TRP can receive the SRS sent by the terminal and perform measurement on the SRS sent by the terminal. Thus, the base station can obtain a measurement result based on each TRP. Each TRP can, based on the same configuration information, receive the SRS sent by the terminal, and the measurement results obtained by different TRPs may be different.

Hence, when there are a plurality of TRPs disposed in the base station, the base station may obtain a plurality of measurement results. Based on the request information, the base station may carry the measurement results obtained by a plurality of TRPs in the second message and send the second message to the core network, such that the core network determines the position of the terminal based on the received measurement results.

In this case, the core network can obtain a plurality of measurement results by receiving a second message from one base station, and then, based on the plurality of measurement results, determine the position of the terminal.

But, when there is only one TRP in the base station, the second message includes only one measurement result. It is difficult for the core network to accurately determine the position of the terminal based on the measurement result. In this case, the core network may send a measurement result request carrying the SRS configuration information to other base stations (e.g., neighboring or non-neighboring base stations of the base station determine the SRS configuration information), such that other base stations can, based on the SRS configuration information, receive the SRS sent by the terminal and then perform measurement on the SRS sent by the terminal and then send a measurement result to the core network. Thus, the core network can determine the position of the terminal based on a plurality of measurement results.

Figure 5:
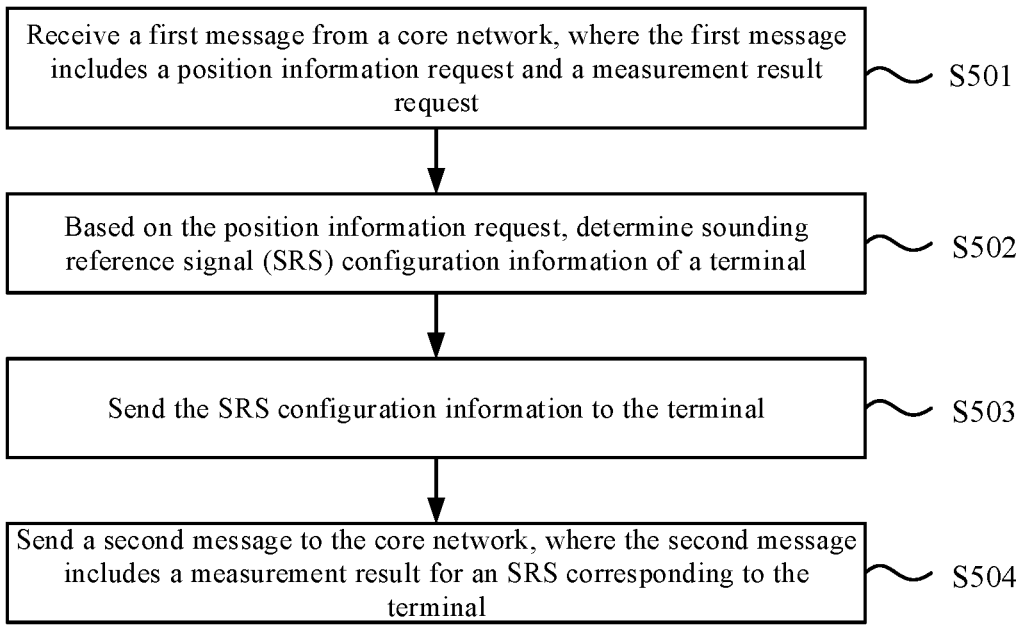
FIG. 5 is a schematic flowchart illustrating a measurement result sending method according to an embodiment of the present disclosure.

FIG. 5 is a schematic flowchart illustrating a measurement result sending method according to an embodiment of the present disclosure. The method shown in this embodiment is applied to a base station, for example, to the base station in the above-mentioned request sending method. The base station may include, but not be limited to, a 5G base station and a 6G base station. The base station may communicate with a terminal and a core network. The terminal may include, but is not limited to, a smartphone, a tablet computer, a wearable device, an industrial sensor, an internet-of-things device, and other electronic devices.

As shown in FIG. 5, the measurement result sending method may include the following steps.

At step S501, a first message is received from the core network, where the first message includes a position information request and a measurement result request.

At step S502, based on the position information request, sounding reference signal (SRS) configuration information of a terminal is determined.

At step S503, the SRS configuration information is sent to the terminal.

At step S504, a second message is sent to the core network, where the second message includes a measurement result for an SRS sent by the terminal.

According to an embodiment of the present disclosure, the base station may obtain the position information request and the measurement result request from one message (i.e., the first message), and send the measurement result for the SRS sent by the terminal to the core network by only sending one message (i.e., the second message) to the core network. Thus, the number of times of communication between the core network and the base station can be reduced, such that the positioning flow is simplified, the time required for a positioning process is reduced, and the requirements for low delay are satisfied.

In some embodiments, the step S504 may specifically include: based on the measurement result request, sending the second message to the core network, where the second message includes the measurement result for the SRS sent by the terminal.

Figure 6:
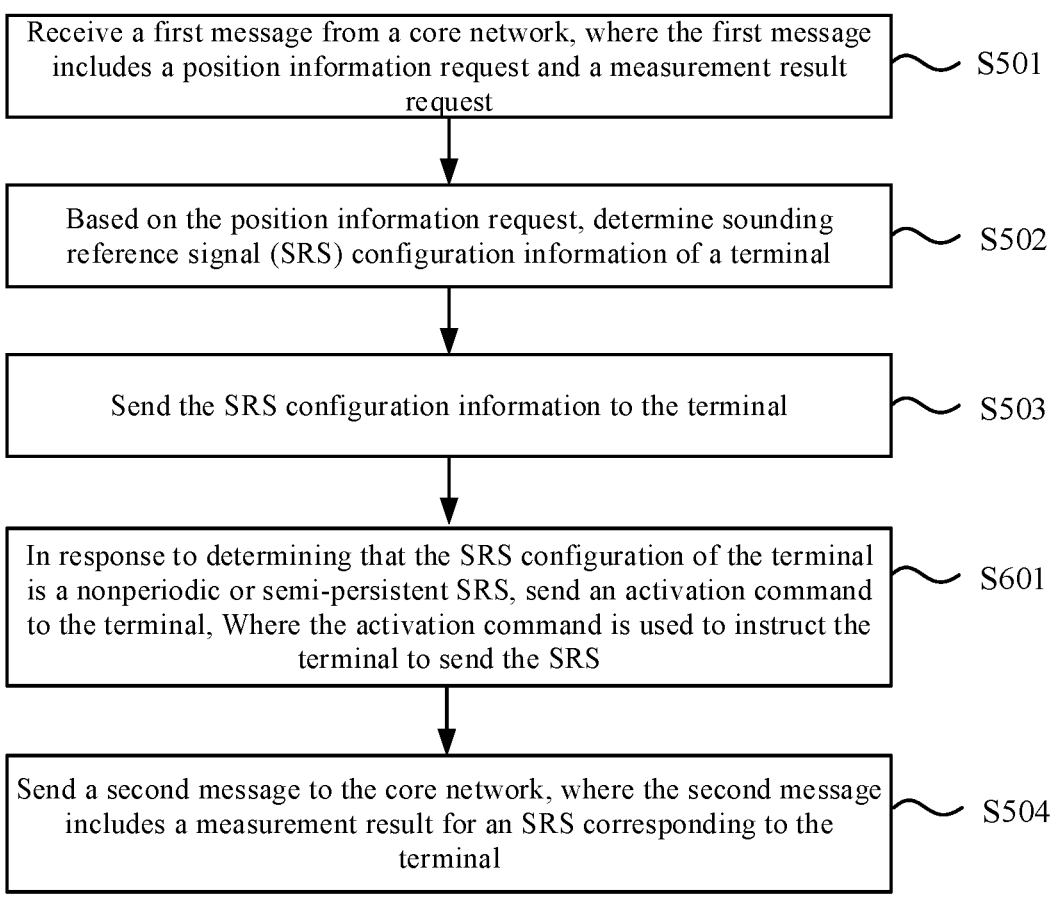
FIG. 6 is a schematic flowchart illustrating a measurement result sending method according to another embodiment of the present disclosure.

FIG. 6 is a schematic flowchart illustrating a measurement result sending method according to another embodiment of the present disclosure. As shown in FIG. 6, the method further includes the following steps.

At step S601, in response to determining that the SRS configuration information of the terminal is a nonperiodic or semi-persistent SRS, an activation command is sent to the terminal.

Where the activation command is used to instruct the terminal to send the SRS.

In an embodiment, when the SRS configuration information of the terminal is a nonperiodic or semi-persistent SRS, the base station may control a time that the terminal sends the SRS. For example, when an SRS activation command is sent to the terminal, the terminal may send the SRS to the base station; and when no SRS activation command is sent to the terminal, the terminal does not send the SRS to the base station.

Figure 7:
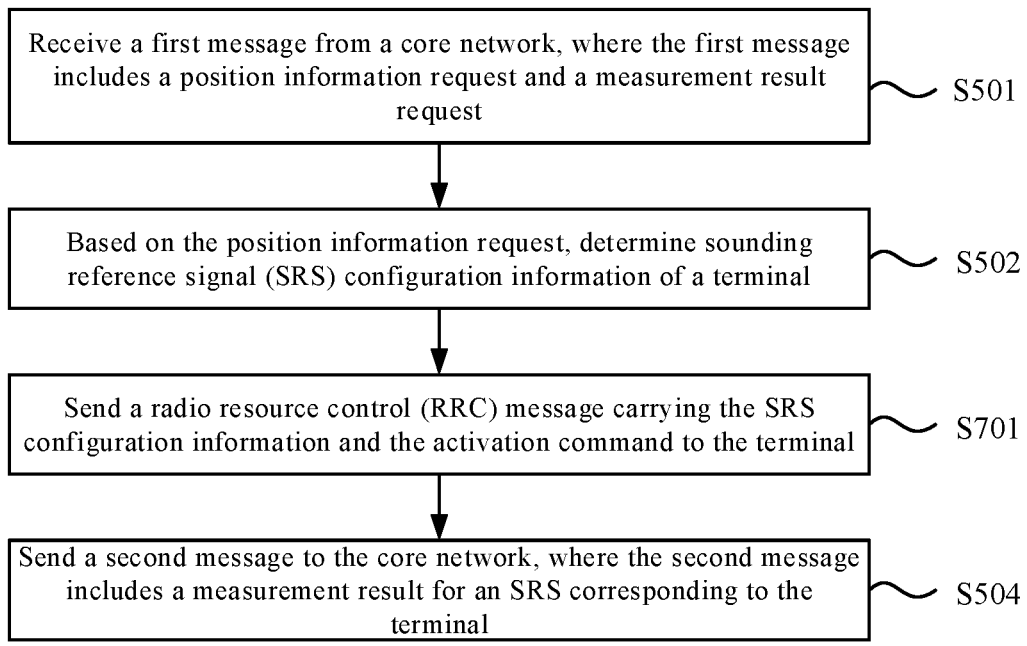
FIG. 7 is a schematic flowchart illustrating a measurement result sending method according to yet another embodiment of the present disclosure.

FIG. 7 is a schematic flowchart illustrating a measurement result sending method according to yet another embodiment of the present disclosure. As shown in FIG. 7, sending the activation command to the terminal includes the following step.

At step S701, a radio resource control (RRC) message carrying the SRS configuration information and the activation command is sent to the terminal.

In an embodiment, the base station may send an RRC message carrying both the SRS configuration information and the activation command to the terminal. Thus, the SRS configuration information and the activation command can be sent to the terminal through a message. Therefore, the number of times of communication between the terminal and the base station can be reduced, such that the positioning flow is simplified, the time required for a positioning process is reduced, and the requirements for low delay are satisfied.

Figure 8:
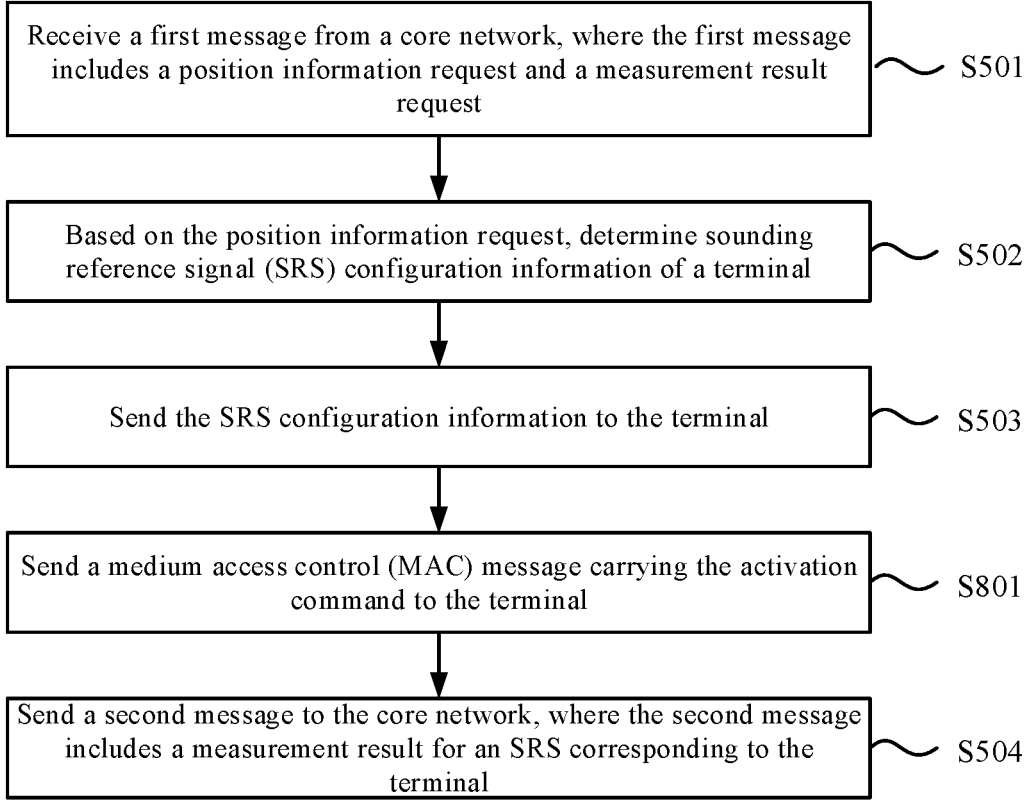
FIG. 8 is a schematic flowchart illustrating a measurement result sending method according to still another embodiment of the present disclosure.

FIG. 8 is a schematic flowchart illustrating a measurement result sending method according to still another embodiment of the present disclosure. As shown in FIG. 8, sending the activation command to the terminal may include the following step.

At step S801, a medium access control (MAC) message carrying the activation command is sent to the terminal.

In an embodiment, corresponding to the embodiment shown in FIG. 7, the base station may also send the activation command to the terminal through a separate message, for example, through a MAC message carrying the activation command. Whether the activation command is sent based on the embodiment shown in FIG. 7 or 8 will be dependent on actual requirements.

Figure 9:
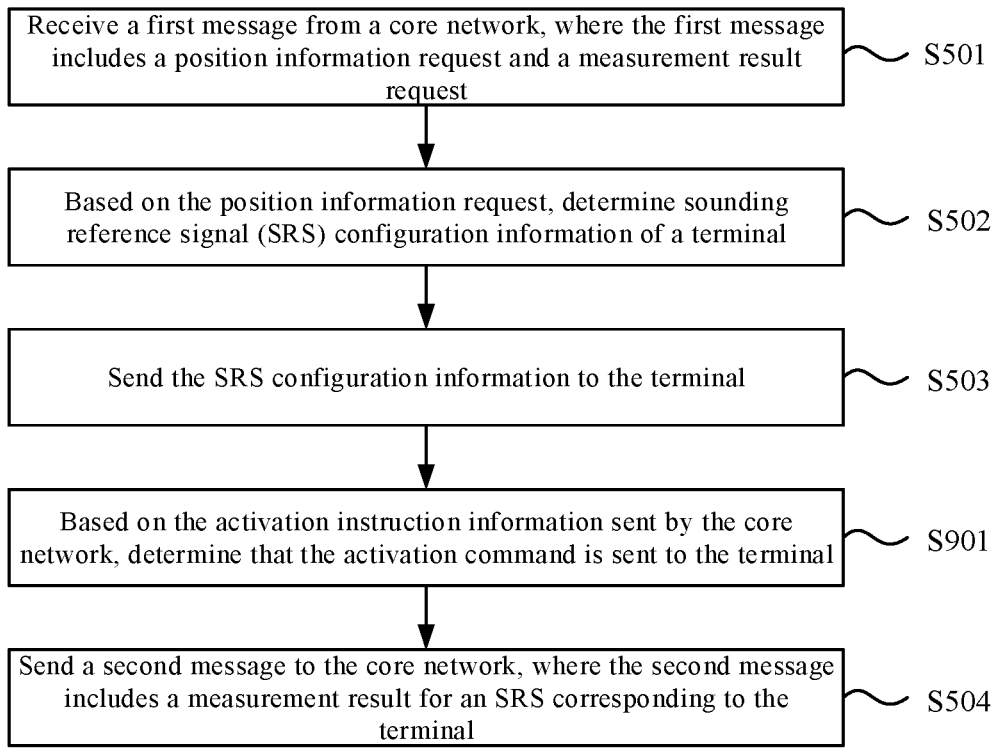
FIG. 9 is a schematic flowchart illustrating a measurement result sending method according to still another embodiment of the present disclosure.

FIG. 9 is a schematic flowchart illustrating a measurement result sending method according to still another embodiment of the present disclosure. As shown in FIG. 9, sending the activation command to the terminal may include the following step.

At step S901, based on the activation instruction information sent by the core network, it is determined that the activation command is sent to the terminal.

In an embodiment, the core network may, by sending the activation instruction information to the base station, request the base station to activate the terminal to send the SRS or request the base station not to activate the terminal to send the SRS.

For example, the SRS configuration information of the terminal is a nonperiodic or semi-persistent SRS. When the activation instruction information includes an activation request, the base station may determine that the core network needs to activate the terminal to send the SRS. Thus, the base station may send the activation command to the terminal to activate the terminal to send the SRS. When the activation instruction information includes a non-activation request, the base station may determine that the core network temporarily does not need to activate the terminal to send the SRS. Thus, the base station does not send the activation command to the terminal.

Figure 10:
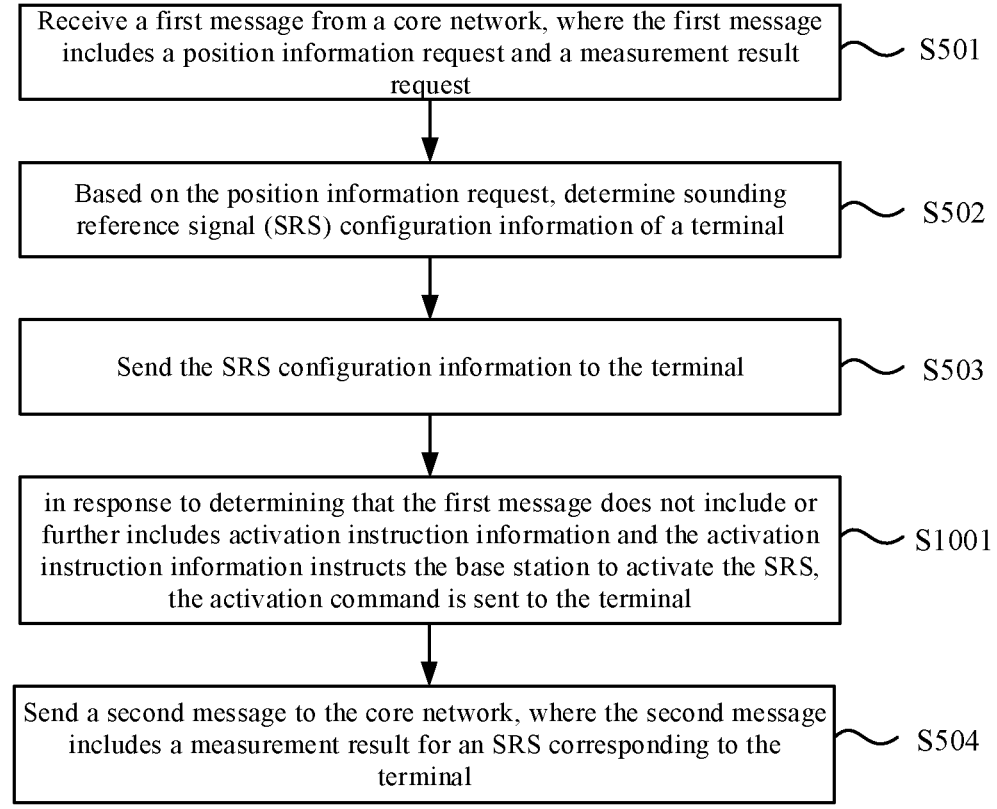
FIG. 10 is a schematic flowchart illustrating a measurement result sending method according to still another embodiment of the present disclosure.

FIG. 10 is a schematic flowchart illustrating a measurement result sending method according to still another embodiment of the present disclosure. As shown in FIG. 10, determining to send the activation command to the terminal based on the activation instruction information sent by the core network may include the following step.

At step S1001, in response to determining that the first message further includes activation instruction information and the activation instruction information instructs the base station to activate the SRS, the activation command is sent to the terminal.

Figure 11:
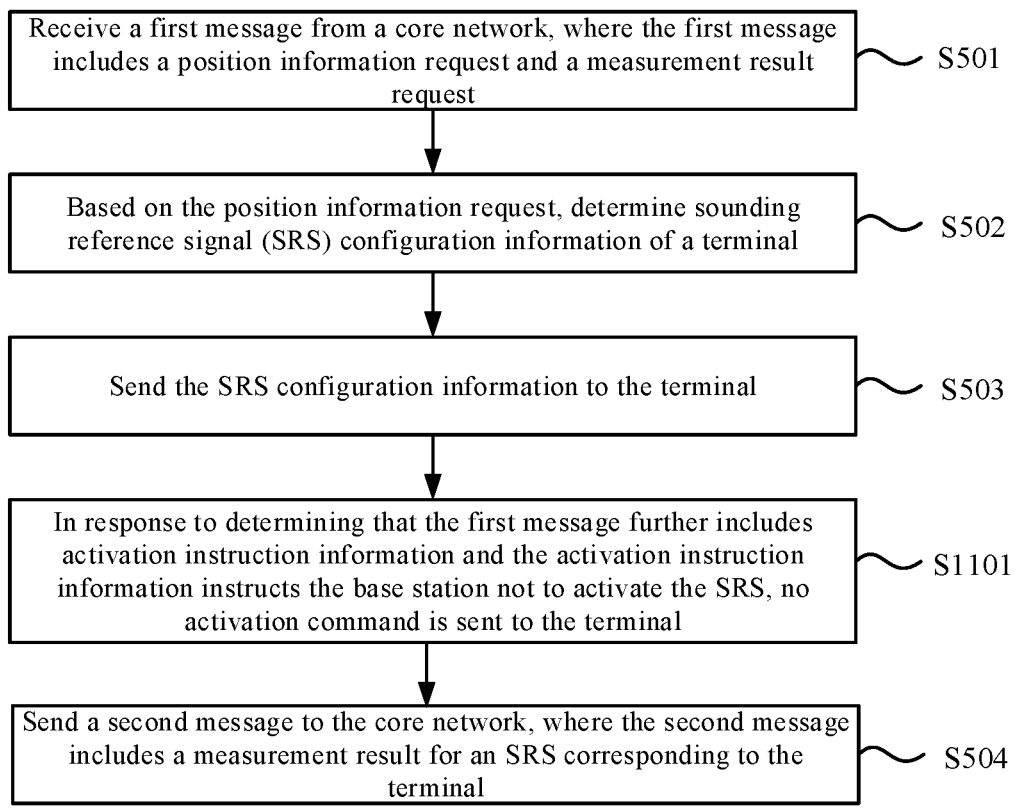
FIG. 11 is a schematic flowchart illustrating a measurement result sending method according to still another embodiment of the present disclosure.

FIG. 11 is a schematic flowchart illustrating a measurement result sending method according to still another embodiment of the present disclosure. As shown in FIG. 11, determining to send the activation command to the terminal based on the activation instruction information sent by the core network may include the following step.

At step S1101, in response to determining that the first message further includes activation instruction information and the activation instruction information instructs the base station not to activate the SRS, no activation command is sent to the terminal.

In an embodiment, the core network may send the activation instruction information to the base station through the first message carrying the activation instruction information. In this case, the position information request, the measurement result request, and the activation instruction information are all carried in one message (i.e., the first message).

Thus, it is not necessary to send the activation instruction information through a separate message. As a result, the number of times of communication between the core network and the base station can be reduced, such that the positioning flow is simplified, the time required for a positioning process is reduced, and the requirements for low delay are satisfied.

When the activation instruction information includes an activation request, the base station may determine that the core network needs to activate the terminal to send the SRS. Thus, the base station may send an activation command to the terminal to activate the terminal to send the SRS.

In an embodiment, when the activation instruction information includes a non-activation request, the base station may determine that the core network temporarily does not need to activate the terminal to send the SRS. Thus, the base station does not send an activation command to the terminal, and the terminal does not send the SRS to the base station.

In an embodiment, based on the activation instruction information sent by the core network, determining to send the activation command to the terminal includes:

in response to determining that the first message does not include activation instruction information, not sending the activation command to the terminal;

or, in response to determining that the first message does not include activation instruction information, sending the activation command to the terminal;

or, in response to determining that the first message includes activation instruction information, sending the activation command to the terminal;

or, in response to determining that the first message includes activation instruction information, not sending the activation command to the terminal.

In an embodiment, when the first message does not include the activation instruction information, it is defaulted that the first message is used to instruct the base station not to activate the SRS; when the first message does not include the activation instruction information, it is also defaulted that the first message is used to instruct the base station to activate the SRS. The two default manners may be negotiated with the base station in advance based on requirements.

Figure 12:
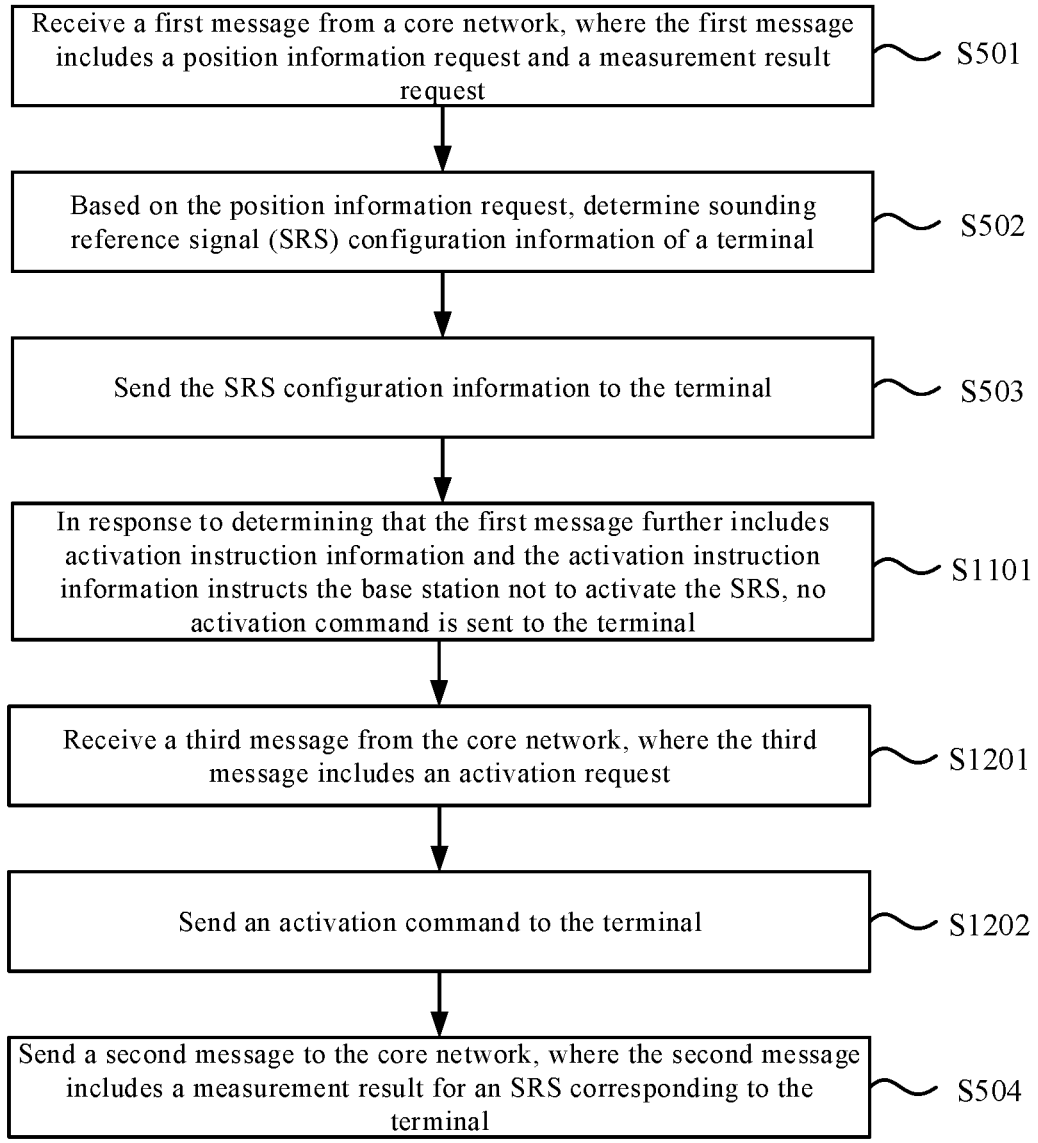
FIG. 12 is a schematic flowchart illustrating a measurement result sending method according to still another embodiment of the present disclosure.

FIG. 12 is a schematic flowchart illustrating a measurement result sending method according to still another embodiment of the present disclosure. As shown in FIG. 12, the method further includes the following steps.

At step S1201, a third message is received from the core network, where the third message includes an activation request.

At step S1202, an activation command is sent to the terminal.

In an embodiment, when the activation instruction information includes a non-activation request, the base station does not send an activation command to the terminal and the terminal does not send the SRS to the base station; when the core network needs the terminal to send the SRS to the base station, the core network may subsequently send a third message carrying an activation request to the base station, such that the base station sends an activation command to the terminal so as to activate the terminal to send the SRS to the base station.

Figure 13:
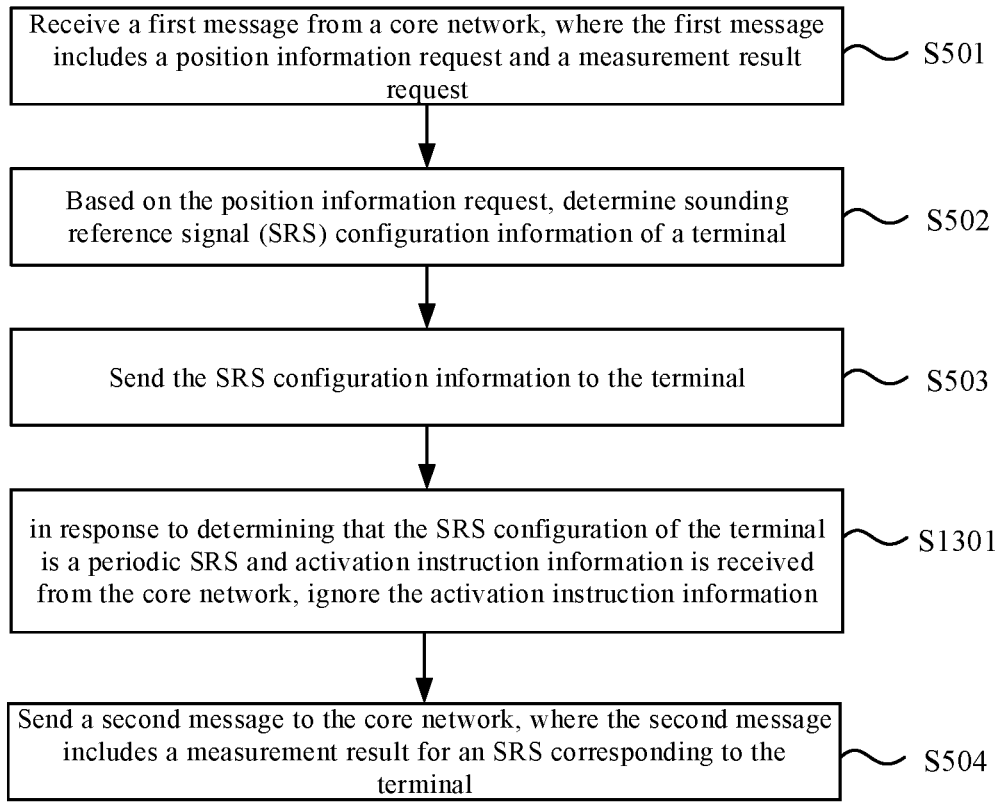
FIG. 13 is a schematic flowchart illustrating a measurement result sending method according to still another embodiment of the present disclosure.

FIG. 13 is a schematic flowchart illustrating a measurement result sending method according to still another embodiment of the present disclosure. As shown in FIG. 13, the method further includes the following step.

At step S1301, in response to determining that the SRS configuration information of the terminal is a periodic SRS and activation instruction information is received from the core network, the activation instruction information is ignored.

In an embodiment, when the SRS configuration of the terminal is periodic SRS, it is not necessary to activate the terminal to send the SRS. Even if the activation instruction information is received from the core network, the activation instruction information can be ignored. Thus, no activation command is sent to the terminal, and unnecessary communication operations are avoided.

In an embodiment, the second message further includes the configuration information.

In an embodiment, the base station may carry the measurement result and the SRS configuration information in one message (i.e., in the second message) and send the second message to the core network. Compared with the fact that the base station sends the SRS configuration information and the measurement result to the core network separately in the related arts, the number of times of communication between the core network and the base station can be reduced, such that the positioning flow is simplified, the time required for a positioning process is reduced and the requirements for the low delay is satisfied.

Figure 14:
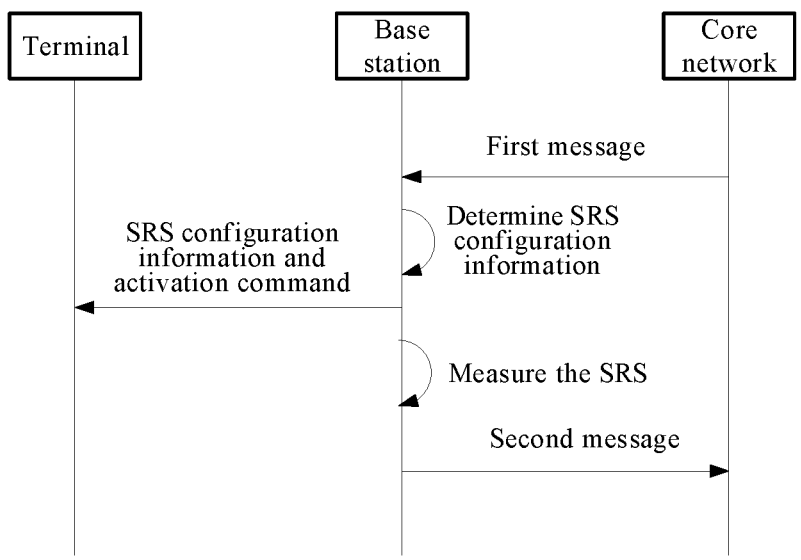
FIG. 14 is a schematic flowchart illustrating a positioning process according to an embodiment of the present disclosure.

FIG. 14 is a schematic flowchart illustrating a positioning process according to an embodiment of the present disclosure.

As shown in FIG. 14, the core network may send the first message to the base station, where the first message includes a position information request and a measurement result request.

After receiving the first message, the base station determines the SRS configuration of the terminal. For example, relevant information about the terminal (including but not limited to an identifier of the terminal) is carried in the first message for the base station to determine the terminal.

Next, the base station sends the SRS configuration information to the terminal through an RRC message. If it is determined that the SRS configuration information of the terminal is a nonperiodic or semi-persistent SRS (for example, according to the SRS configuration information), an activation command is further carried in the RRC message to be sent to the terminal.

After receiving the SRS configuration information, the terminal may, based on the configuration information, determine a resource for sending the SRS to the base station (e.g., time domain resource or frequency domain resource), and then send the SRS to the base station on the determined resource.

The base station receives the SRS from the terminal based on the SRS configuration information, and performs measurements on the received SRS to obtain a measurement result.

Finally, the base station sends the second message carrying the measurement result to the core network, such that the core network determines the position of the terminal based on the measurement result.

By comparison of the embodiment shown in FIG. 14 and the embodiment shown in FIG. 2, it can be clearly seen that in the embodiment shown in FIG. 14, the number of times of communication among the terminal, the core network and the base station is reduced, such that the positioning flow is simplified, the time required for a positioning process is reduced and the requirements for low delay is satisfied.

Figure 15:
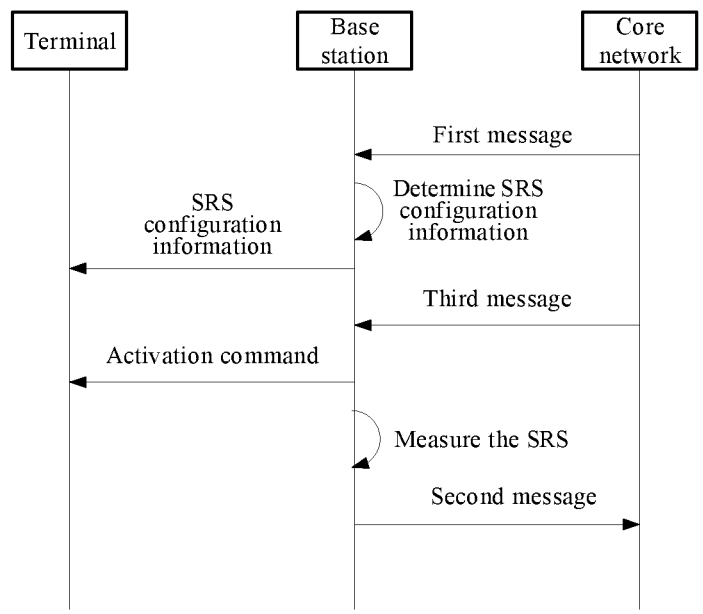
FIG. 15 is a schematic flowchart illustrating a positioning process according to another embodiment of the present disclosure.

FIG. 15 is a schematic flowchart illustrating a positioning process according to another embodiment of the present disclosure. As shown in FIG. 15, the core network may send the first message carrying the position information request, the measurement result request, and the activation instruction information to the terminal, where the activation instruction information includes a non-activation request.

After receiving the first message, the base station determines the SRS configuration of the terminal. For example, relevant information about the terminal (including but not limited to an identifier of the terminal) is carried in the first message for the base station to determine the terminal.

Next, the base station sends the SRS configuration information to the terminal through an RRC message. If it is determined that the SRS configuration information of the terminal is a nonperiodic or semi-persistent SRS (for example, according to the SRS configuration information), no activation command is sent to the terminal temporarily.

If it is determined that the SRS configuration information of the terminal is a periodic SRS, the activation instruction information can be ignored.

The core network may send an activation command to the base station based on requirements. For example, send a third message carrying the activation command to the base station.

After receiving the third message, the base station may, based on the activation command carried in the third message, determine that the core network needs to activate the terminal to send the SRS, and thus send the activation command to the terminal.

After receiving the SRS configuration information, the terminal may, based on the configuration information, determine a resource for sending the SRS to the base station (e.g., time domain resource or frequency domain resource), and thus, after receiving the activation command, send the SRS to the base station on the determined resource.

The base station receives the SRS from the terminal based on the SRS configuration information, and performs measurements on the received SRS to obtain a measurement result.

Finally, the base station sends the second message carrying the measurement result to the core network, such that the core network determines the position of the terminal based on the measurement result.

By comparison of the embodiment shown in FIG. 15 and the embodiment shown in FIG. 2, it can be clearly seen that in the embodiment shown in FIG. 15, the number of times of communication among the terminal, the core network and the base station is reduced, such that the positioning flow is simplified, the time required for a positioning process is reduced and the requirements for low delay is satisfied.

Corresponding to the embodiments of the request sending method and the measurement result sending method, the present disclosure further provides an embodiment of a request sending apparatus and a measurement result sending apparatus.

Figure 16:
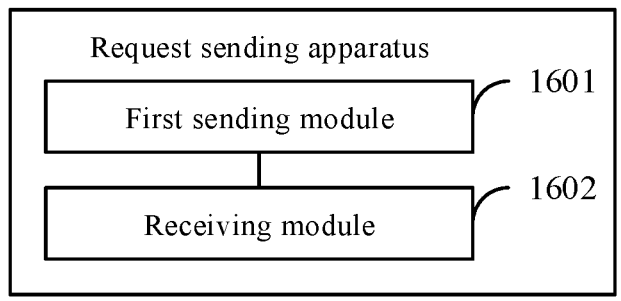
FIG. 16 is a schematic block diagram illustrating a request sending apparatus according to an embodiment of the present disclosure.

FIG. 16 is a schematic block diagram illustrating a request sending apparatus according to an embodiment of the present disclosure. The apparatus shown in this embodiment is applicable to a core network, which includes but is not limited to the location management function (LMF) and access and mobility management function (AMF), etc. The apparatus may be specifically applied to LMF in an embodiment.

The core network includes, but is not limited to, a 5G core network and a 6G core network. The core network may communicate with a base station, for example, by sending a position information request to the base station, and the base station, after receiving the request, may determine the sounding reference signal (SRS) configuration information of a terminal and send the SRS configuration information to the terminal so as to instruct a resource for the terminal to send the SRS.

The SRS is a reference signal sent by the terminal to the base station and may be used to perform uplink (UL) positioning for the terminal and thus can be called positioning SRS, UL positioning SRS, or the like.

The base station may measure a configuration of an SRS sent by the terminal and then send a measurement result to the core network. The core network may, based on a plurality of (e.g., two or more) measurement results, determine a position of the terminal. The terminal may include, but not be limited to, a smartphone, a tablet computer, a wearable device, an industrial sensor, an internet-of-things device, and other electronic devices. As shown in FIG. 16, the request sending apparatus may include:

a first sending module 1601, configured to send a first message to a base station, where the first message includes a position information request and a measurement result request, the position information request is used to request the base station to determine sounding reference signal (SRS) configuration information of a terminal, and the measurement result request is used to request the base station to send a measurement result for an SRS sent by the terminal to the core network; and a receiving module 1602, configured to receive a second message from the base station, where the second message includes the measurement result.

In an embodiment, the first message at least includes activation instruction information for instructing the base station to activate the SRS or not;

where, in response to determining that the activation instruction information instructs the base station to activate the SRS, the base station activates the terminal to send the SRS;

or, in response to determining that the activation instruction information instructs the base station not to activate the SRS, the base station does not activate the terminal to send the SRS.

In an embodiment, the first message may also include or not include: activation instruction information; and the method further includes:

sending the first message not including activation instruction information, where the first message not including activation instruction information is used to instruct the base station not to activate the SRS;

or, sending the first message, not including activation instruction information, where the first message, not including activation instruction information, is used to instruct the base station to activate the SRS.

In an embodiment, the first sending module is further configured to, in response to determining the base station to activate the SRS and determining that the first message instructs the base station not to activate the SRS, send a third message to the base station, where the third message is used to instruct the base station to activate the SRS.

In an embodiment, the second message further includes the SRS configuration information.

Figure 17:
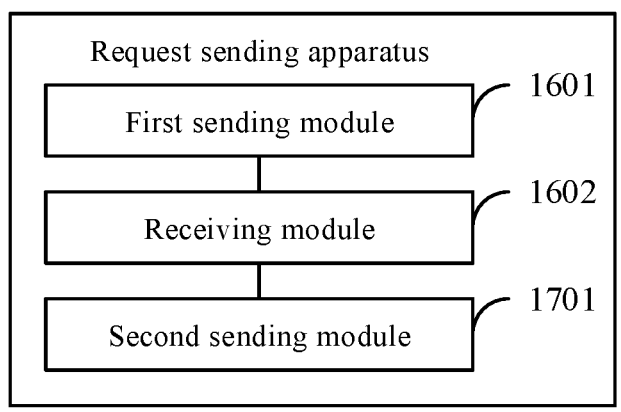
FIG. 17 is a schematic block diagram illustrating a request sending apparatus according to another embodiment of the present disclosure.

FIG. 17 is a schematic block diagram illustrating a request sending apparatus according to another embodiment of the present disclosure. As shown in FIG. 17, the apparatus further includes:

a second sending module 1701, configured to send a measurement result request to other base stations, where the measurement result request sent to other base stations includes the SRS configuration information.

Figure 18:
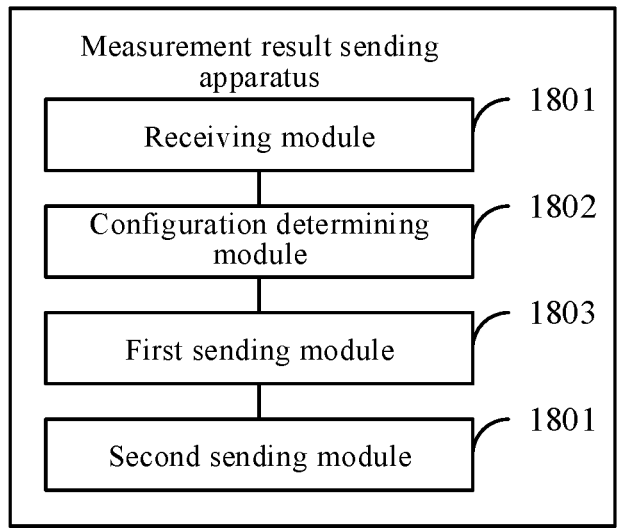
FIG. 18 is a schematic block diagram illustrating a measurement result sending apparatus according to an embodiment of the present disclosure.

FIG. 18 is a schematic block diagram illustrating a measurement result sending apparatus according to an embodiment of the present disclosure. The apparatus shown in this embodiment is applied to a base station, for example, to the base station in the above request sending method. The base station may include, but is not limited to, a 5G base station and a 6G base station. The base station may communicate with a terminal and a core network. The terminal may include, but is not limited to, a smartphone, a tablet computer, a wearable device, an industrial sensor, an internet-of-things device, and other electronic devices. As shown in FIG. 18, the measurement result sending apparatus may include:

a receiving module 1801, configured to receive a first message from a core network, where the first message includes a position information request and a measurement result request;

a configuration determining module 1802, configured to, based on the position information request, determine sounding reference signal (SRS) configuration information of a terminal;

a first sending module 1803, configured to send the SRS configuration information to the terminal; and a second sending module 1804, configured to, based on the measurement result request, send a second message to the core network, where the second message includes a measurement result for an SRS sent by the terminal.

In an embodiment, the first sending module is further configured to, in response to determining that the SRS configuration information of the terminal is a nonperiodic or semi-persistent SRS, send an activation command to the terminal;

where the activation command is used to instruct the terminal to send the SRS.

In an embodiment, the first sending module is further configured to send a radio resource control (RRC) message carrying the SRS configuration information and the activation command to the terminal.

In an embodiment, the first sending module is further configured to send a medium access control (MAC) message carrying the activation command to the terminal.

In an embodiment, the first sending module is further configured to, based on activation instruction information sent by the core network, determine to send the activation command to the terminal.

In an embodiment, the first sending module is further configured to, in response to determining that the first message further includes activation instruction information and the activation instruction information instructs the base station to activate the SRS, send the activation command to the terminal.

In an embodiment, the first sending module is further configured to, in response to determining that the first message further includes activation instruction information and the activation instruction information instructs the base station not to activate the SRS, not send the activation command to the terminal.

In an embodiment, the first sending module is further configured to, in response to determining that the first message does not include activation instruction information, not send the activation command to the terminal; or in response to determining that the first message does not include activation instruction information, send the activation command to the terminal.

In an embodiment, the receiving module is further configured to receive a third message from the core network, where the third message includes an activation request;

the first sending module is further configured to send the activation command to the terminal.

Figure 19:
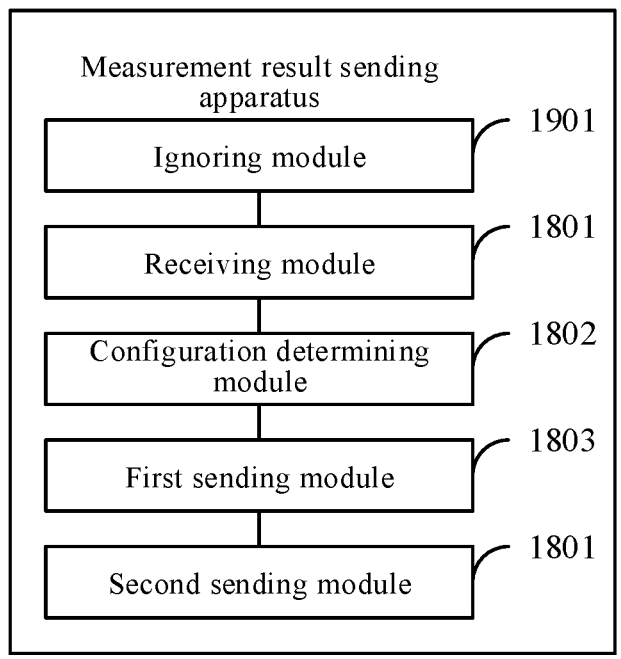
FIG. 19 is a schematic block diagram illustrating a measurement result sending apparatus according to another embodiment of the present disclosure.

FIG. 19 is a schematic block diagram illustrating a measurement result sending apparatus according to another embodiment of the present disclosure. As shown in FIG. 19, the apparatus further includes:

an ignoring module 1901, configured to, in response to determining that the SRS configuration information of the terminal is periodic SRS and activation instruction information is received from the core network, ignore the activation instruction information.

In an embodiment, the second message further includes the configuration information.

The specific manner in which each module in the apparatuses shown in the above embodiments performs operations is already described in detail in the embodiments of the relevant method and will not be repeated herein.

Since the apparatus embodiments substantially correspond to the method embodiments, reference may be made to part of the descriptions of the method embodiments for the related part. The apparatus embodiments described above are merely illustrative, where the modules described as separate members may be or not be physically separated, and the members displayed as modules may be or not be physical modules, i.e., may be located in one place, or may be distributed to a plurality of network modules. Part or all of the modules may be selected according to actual requirements to implement the objectives of the solutions in the embodiments. Those of ordinary skill in the art may understand and carry out them without creative work.

An embodiment of the present disclosure further provides an electronic device, including:

a processor; and a memory storing instructions executable by the processor;

where the processor is configured to perform the request sending method of any one of the above embodiments.

An embodiment of the present disclosure further provides an electronic device, including:

a processor; and a memory storing instructions executable by the processor;

where the processor is configured to perform the measurement result sending method of any one of the above embodiments.

An embodiment of the present disclosure further provides a computer readable storage medium, storing computer programs thereon. The programs are executed by a processor to perform the steps of the request sending method of any one of the above embodiments.

An embodiment of the present disclosure further provides a computer readable storage medium, storing computer programs thereon. The programs are executed by a processor to perform the steps of the measurement result sending method of any one of the above embodiments.

Figure 20:
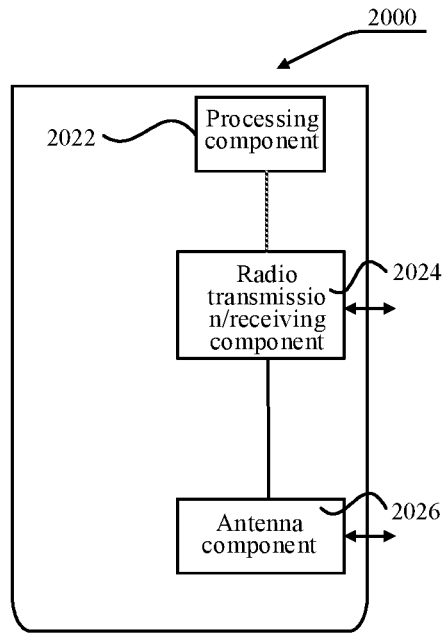
FIG. 20 is a schematic block diagram illustrating a device for sending a measuring result according to an embodiment of the present disclosure.

FIG. 20 is a schematic block diagram illustrating a device 2000 for sending a measuring result according to an embodiment of the present disclosure. As shown in FIG. 20, The device 2000 may be provided as a base station. By referring to FIG. 20, the device 2000 includes a processing component 2022, a radio transmission/receiving component 2024, an antenna component 2026, and a signal processing part specific to radio interface. The processing component 2022 may further include one or more processors. One of the processors in the processing component 2022 may be configured to perform the measurement result sending method of any one of the above embodiments.

Figure 21:
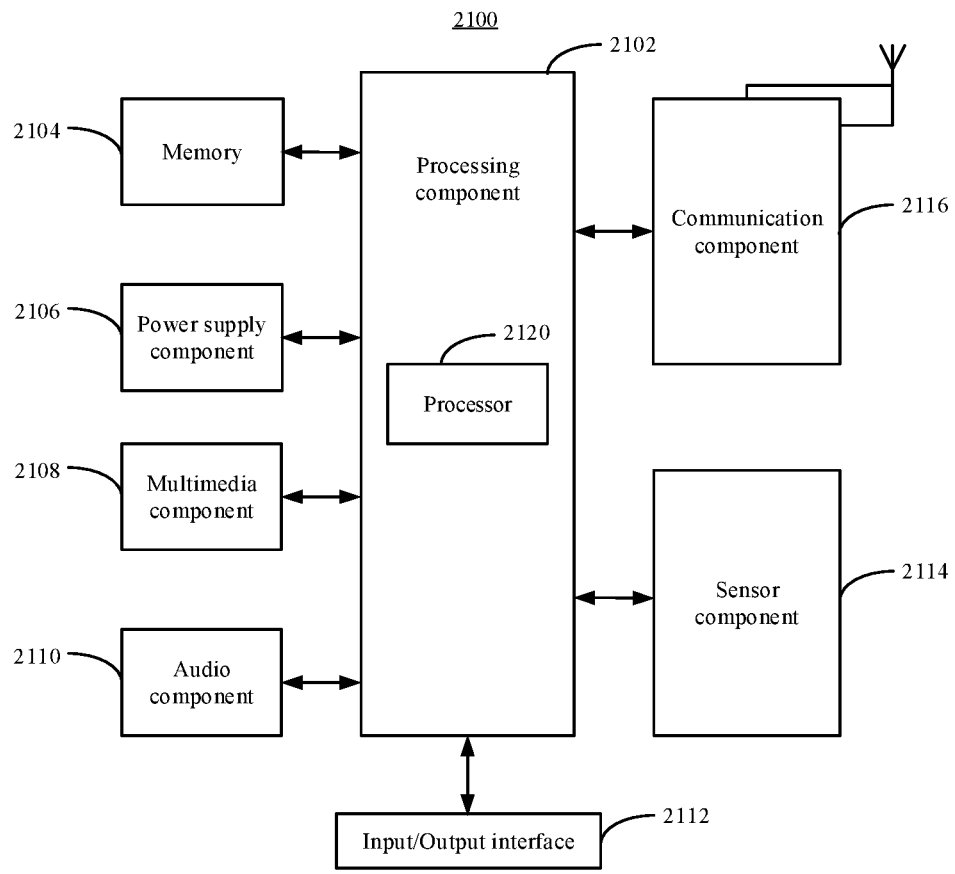
FIG. 21 is a schematic block diagram illustrating a terminal according to an embodiment of the present disclosure.

FIG. 21 is a schematic block diagram illustrating a terminal 2100 according to an embodiment of the present disclosure. For example, the terminal 2100 may be a mobile phone, a computer, a digital broadcast terminal, a message transceiver, a game console, a tablet device, a medical device, a fitness device, and a personal digital assistant, etc.

By referring to FIG. 21, the terminal 2100 may include one or more of: a processing component 2102, a memory 2104, a power supply component 2106, a multimedia component 2108, an audio component 2110, an input/output (I/O) interface 2112, a sensor component 2114, and a communication component 2116.

The processing component 2102 generally controls overall operations of the terminal 2100, such as operations associated with display, phone calls, data communications, camera operations, and recording operations. The processing component 2102 may include one or more processors 2120 to execute instructions to complete all or part of the steps of the above methods. In addition, the processing component 2102 may include one or more modules that facilitate the interaction between the processing component 2102 and other components. For example, the processing component 2102 may include a multimedia module to facilitate the interaction between the multimedia component 2108 and the processing component 2102.

The memory 2104 is configured to store various types of data to support the operation of the terminal 2100. Examples of such data include instructions for any application or method operated on the terminal 2100, contact data, phonebook data, messages, pictures, videos, and so on. The memory 2104 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or compact disk.

The power supply component 2106 supplies power for different components of the terminal 2100. The power supply component 2106 may include a power supply management system, one or more power supplies, and other components associated with generating, managing, and distributing power for the terminal 2100.

The multimedia component 2108 includes a screen that provides an output interface between the terminal 2100 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 2108 includes a front camera and/or a rear camera. When the terminal 2100 is in an operation mode, such as a shooting mode or a video mode, the front camera and/or the rear camera may receive external multimedia data. Each of the front and rear cameras may be a fixed optical lens system or have a focal length and an optical zoom capability.

The audio component 2110 is configured to output and/or input audio signals. For example, the audio component 2110 includes a microphone (MIC) configured to receive an external audio signal when the terminal 2100 is in an operation mode, such as a call mode, a recording mode, and a voice recognition mode. The received audio signal may be further stored in the memory 2104 or transmitted via the communication component 2116. In some examples, the audio component 2110 also includes a loudspeaker for outputting an audio signal.

The I/O interface 2112 provides an interface between the processing component 2102 and a peripheral interface module, which may be a keyboard, a click wheel, a button, or the like. These buttons may include, but are not limited to, a home button, a volume button, a start button, and a lock button.

The sensor component 2114 includes one or more sensors for providing a status assessment in various aspects to the terminal 2100. For example, the sensor component 2114 may detect an open/closed state of the terminal 2100, and the relative positioning of components. For example, the component is a display and a keypad of the terminal 2100. The sensor component 2114 may also detect a change in position of the terminal 2100 or a component of the terminal 2100, the presence or absence of a user in contact with the terminal 2100, the orientation or acceleration/deceleration of the terminal 2100, and a change in temperature of the terminal 2100. The sensor component 2114 may include a proximity sensor configured to detect the presence of nearby objects without any physical contact. The sensor component 2114 may also include a light sensor, such as a CMOS or CCD image sensor, for use in imaging applications. In some examples, the sensor component 2114 may also include an acceleration sensor, a gyro sensor, a magnetic sensor, a pressure sensor, or a temperature sensor.

The communication component 2116 is configured to facilitate wired or wireless communication between the terminal 2100 and other devices. The terminal 2100 may access a wireless network based on a communication standard, such as WiFi, 2G, 3G, 4G LTE, 5G NR, or a combination thereof. In an example, the communication component 2116 receives broadcast signals or broadcast associated information from an external broadcast management system via a broadcast channel. In an example, the communication component 2116 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the terminal 2100 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above method.

In an example, there is also provided a non-transitory computer readable storage medium including instructions, such as a memory 2104 including instructions, where the instructions are executable by the processor 2120 of the terminal 2100 to perform the method as described above. For example, the non-transitory computer readable storage medium may be a read only memory (ROM), a random access memory (RAM), a CD-ROM, a magnetic tape, a floppy disk, and an optical data storage device, etc.

Other implementations of the present disclosure will be apparent to those skilled in the art from consideration of the specification and practice of the present disclosure herein. The present disclosure is intended to cover any variations, uses, or adaptations of the present disclosure that follow the general principles thereof and include common knowledge or conventional technical means in the related art that are not disclosed in the present disclosure. The specification and examples are considered exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus provided according to the embodiments of the present disclosure. Specific examples are used herein to set forth the principles and the implementations of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limited to the present disclosure.

The invention claimed is:

1. A request sending method, applied to a core network and comprising:
    sending a first message to a base station, wherein the first message comprises a position information request and a measurement result request, the position information request is used to request the base station to determine sounding reference signal (SRS) configuration information of a terminal, the SRS configuration information of the terminal is a nonperiodic or semi-persistent SRS, and the measurement result request is used to request the base station to send a measurement result for an SRS sent by the terminal to the core network; and
    receiving a second message from the base station, wherein the second message comprises the measurement result and the SRS configuration information;
    wherein the first message further comprises activation instruction information for instructing the base station to activate the SRS or not;
    wherein in response to determining that the activation instruction information instructs the base station to activate the SRS, the base station activates the terminal to send the SRS; or in response to determining that the activation instruction information instructs the base station not to activate the SRS, the base station does not activate the terminal to send the SRS;
    wherein the method further comprises:
        in response to determining that the activation instruction information of the first message instructs the base station not to activate the SRS, sending a third message to the base station when the core network needs the terminal to send the SRS to the base station, wherein the third message comprises an activation request for instructing the base station to activate the terminal to send the SRS, the first message is a new radio (NR) positioning protocol A (NRPPa) message, and the third message is another type of message.

2. The method claim 1, further comprising:
    in response to determining that there is only one transmission reception point (TRP) in the base station, sending measurement result requests to other base stations, respectively, wherein the measurement result requests sent to the other base stations comprise the SRS configuration information.

3. An electronic device, comprising:
    a processor; and
    a memory storing instructions executable by the processor;
    wherein the processor is configured to perform operations comprising:
    sending a first message to a base station, wherein the first message comprises a position information request and a measurement result request, the position information request is used to request the base station to determine sounding reference signal (SRS) configuration information of a terminal, the SRS configuration information of the terminal is a nonperiodic or semi-persistent SRS, and the measurement result request is used to request the base station to send a measurement result for an SRS sent by the terminal to the core network; and
    receiving a second message from the base station, wherein the second message comprises the measurement result and the SRS configuration information;
    wherein the first message further comprises activation instruction information for instructing the base station to activate the SRS or not;
    wherein in response to determining that the activation instruction information instructs the base station to activate the SRS, the base station activates the terminal to send the SRS; or in response to determining that the activation instruction information instructs the base station not to activate the SRS, the base station does not activate the terminal to send the SRS;
    wherein the operations further comprise:
    in response to determining that the activation instruction information of the first message instructs the base station not to activate the SRS, sending a third message to the base station when the core network needs the terminal to send the SRS to the base station, wherein the third message comprises an activation request for instructing the base station to activate the terminal to send the SRS, the first message is a new radio (NR) positioning protocol A (NRPPa) message, and the third message is another type of message.

4. A non-transitory computer readable storage medium, storing computer programs thereon, wherein the computer programs when executed by a processor cause the processor to perform the request sending method of claim 1.

5. A measurement result sending method, applied to a base station and comprising:
    receiving a first message from a core network, wherein the first message comprises a position information request and a measurement result request;
    based on the position information request, determining sounding reference signal (SRS) configuration information of a terminal, wherein the SRS configuration information of the terminal is a nonperiodic or semi-persistent SRS, and the SRS configuration information is sent to the terminal; and sending a second message to the core network, wherein the second message comprises a measurement result for an SRS corresponding to the terminal and the SRS configuration information;

wherein the first message further comprises activation instruction information for instructing the base station to activate the SRS or not;

wherein in response to determining that the activation instruction information instructs the base station to activate the SRS, activation command is sent to the terminal; or in response to determining that the activation instruction information instructs the base station not to activate the SRS, the activation command is not sent to the terminal;

wherein the activation command is configured for instructing the terminal to send the SRS;

wherein the method further comprises:

in response to determining that the activation instruction information of the first message instructs the base station not to activate the SRS, receiving a third message from the core network when the core network needs the terminal to send the SRS to the base station, wherein the third message comprises an activation request for instructing the base station to activate the terminal to send the SRS, the first message is a new radio (NR) positioning protocol A (NRPPa) message, and the third message is another type of message.

6. The method of claim 5, wherein the activation command is sent to the terminal through a radio resource control (RRC) message or a medium access control (MAC) message.

7. The method of claim 5, further comprising:

in response to determining that the SRS configuration information of the terminal is a periodic SRS and activation instruction information is received from the core network, ignoring the activation instruction information.

8. An electronic device, comprising:

a processor; and a memory storing instructions executable by the processor;

wherein the processor is configured to perform the measurement result sending method of claim 5.

9. A non-transitory computer readable storage medium, storing computer programs thereon, wherein the computer programs when executed by a processor cause the processor to perform the measurement result sending method of claim 5.

* * * * *